United States Patent [19]
Stokes

[11] 3,748,409
[45] July 24, 1973

[54] TELEPHONE BRACKET

[75] Inventor: William E. Stokes, Lakewood, Ohio
[73] Assignee: Motivated Images, Inc., Cleveland, Ohio

[22] Filed: Dec. 6, 1971
[21] Appl. No.: 205,114

[52] U.S. Cl. .......... 179/149, 248/289
[51] Int. Cl. .......... H04m 1/11
[58] Field of Search .......... 179/146 R, 149–151; 248/288–289, 295

[56] References Cited

UNITED STATES PATENTS

| | | | |
|---|---|---|---|
| 262,180 | 8/1882 | Hadley | 179/149 |
| 2,535,330 | 12/1950 | Stone | 179/149 |
| 3,423,057 | 1/1968 | Iverson | 248/296 |
| 2,696,965 | 12/1954 | Maxwell | 248/316 |

*Primary Examiner*—William C. Cooper
*Attorney*—Thomas E. Davis

[57] ABSTRACT

An apparatus for supporting a telephone in a hospital room having an adjustable bed and a privacy curtain therein. In a preferred embodiment, the apparatus includes a mounting plate adapted for attachment to a wall of the room, an arm is pivotally attached to the mounting plate and has a first portion extending a predetermined horizontal distance into the room beneath the privacy curtain and at a position below the lowest adjustment level of the bed. A second portion of the arm extends a predetermined vertical distance upward from the first portion. The second portion is configured to engage a surface of the bed to limit swinging movement relative thereto and is adapted for mounting a telephone thereon, whereby a telephone mounted on the second portion may be swingably supported relative to the bed and positionable within easy reach of a patient lying on the bed in all operable positions (raised or lowered) of the hospital bed without interfering with either closing of the privacy curtain or adjustment of the bed.

10 Claims, 2 Drawing Figures

TELEPHONE BRACKET

This invention relates to a swingable telephone support for use in a hospital room having an adjustable bed and a privacy curtain therein.

The normal location of telephones in hospital rooms is adjacent a wall of the room to provide convenience in arranging the rooms and standardization when connecting the telephones in telephonic circuits. Where adjustable, hospital type, beds are used, this has caused considerable inconvenience to patients. For example, if the hospital bed was in the "up position" at the head section, a telephone mounted on the head wall, would be approximately three to four feet behind the patient, consequently, the patient would not be able to reach the telephone without getting out of bed. The only alternative would be to have someone hand him the telephone and dial the number for him.

Another problem was that when the telephone was located on the head wall in the semi-private or ward room, it was difficult for the other patients to reach the telephone when it was positioned adjacent one of the beds. Several attempts to provide a telephone mount which would enable a patient to conveniently use the telephone have been made. These attempts include the use of bed side cabinets with a desk type telephone installed or placed on the cabinet, a shelf on the side of the bed, and swingable mountings. None of these solutions to date has been completely satisfactory in that the solutions did not provide the desired convenience for the patient. Also, in the case of the bedside stand, when the bed side stand was moved, it frequently placed the telephone out of the patient's reach, also occasionally the telephone would be pulled off the cabinet and damaged.

In the case of the swingable telephone supports, the patient either could not reach the telephone in all operable raised or lowered positions of the hospital bed or else the support apparatus interfered with operation of other equipment in the room, for example closing of the privacy curtain, or adjustment of the hospital bed.

Swingable telephone supports are known in the art. Moreover, swingable telephone supports for use in a hospital room are also known in the art. However, these telephone supports have several inherent limitations.

One such limitation is that these devices can only be effectively used in a private hospital room for one patient. When these devices are used in a semi-private or ward hospital room having a plurality of beds and a privacy curtain suspended between the beds, these devices interfere with closing of the privacy curtain. Thus, the patient must either use the telephone with the privacy curtain open or have someone remove the telephone from the support and stretch the telephone cord beneath the privacy curtain before closing it.

Furthermore, as is well known, the surface of a hospital bed is adjustable in that it may be raised, lowered, or tilted to various positions. Accordingly, if the telephone supports of the prior art were positioned beneath the privacy curtain, a patient lying on the bed would be unable to easily reach the telephone in at least some of the raised, or tilted positions of the hospital bed.

Another problem of the prior art devices is that when the hospital bed is in a lowered position, there is nothing to prevent the device from being positioned over the bed. Thus, should one of the prior art devices be so placed inadvertently and the bed subsequently raised, a patient lying on the bed could be seriously injured by being crushed between the bed and the swingable bracket. Further, even if no patient was lying on the bed when this occurs, the bracket would be wrenched from its mountings causing damage to the telephone apparatus.

Another problem of the prior art is that even if some limits would be placed on the degree of swinging movement, these limits would have to be readjusted everytime the hospital bed was moved in order to insure that the device could not be positioned over the bed and that the telephone was always within easy reach of a patient lying on the bed.

The most pertinent examples of prior art devices known to the applicant are U.S. Pat. No. 2,535,330, issued Dec. 26, 1950 to Stone and U.S. Pat. No. 3,112,968, issued Dec. 3, 1963 to Cotton et al.

Both of these patents disclose devices for swingably supporting a telephone, however neither of these devices would be effective to solve the problems previously noted.

Accordingly, it is an object of the present invention to provide a swingable telephone support for use in a hospital room having an adjustable bed and a privacy curtain suspended in the room to provide privacy for a patient lying on the bed, and wherein the telephone support has provision to eliminate interference with closing of the privacy curtain while supporting the telephone within easy reach of a patient lying on the bed.

Another object of the present invention is to provide a swingable telephone support bracket as in the foregoing object and wherein the telephone is supported within easy reach of a patient lying on the bed in all operable positions of the hospital bed.

Another object of the present invention is to provide a swingable telephone support apparatus for use in a hospital room having an adjustable bed therein and wherein the apparatus is prevented from moving into overlapping relationship with the surface of the bed in all operable positions of the bed.

A still further object of the present invention is to provide a swingable telephone support apparatus having means for engaging a side surface of an adjustable bed in all of the various adjusted positions thereof to limit movement of the apparatus relative thereto.

Other objects and advantages will become more apparent from the description which follows hereinafter:

Figures 1, 2:
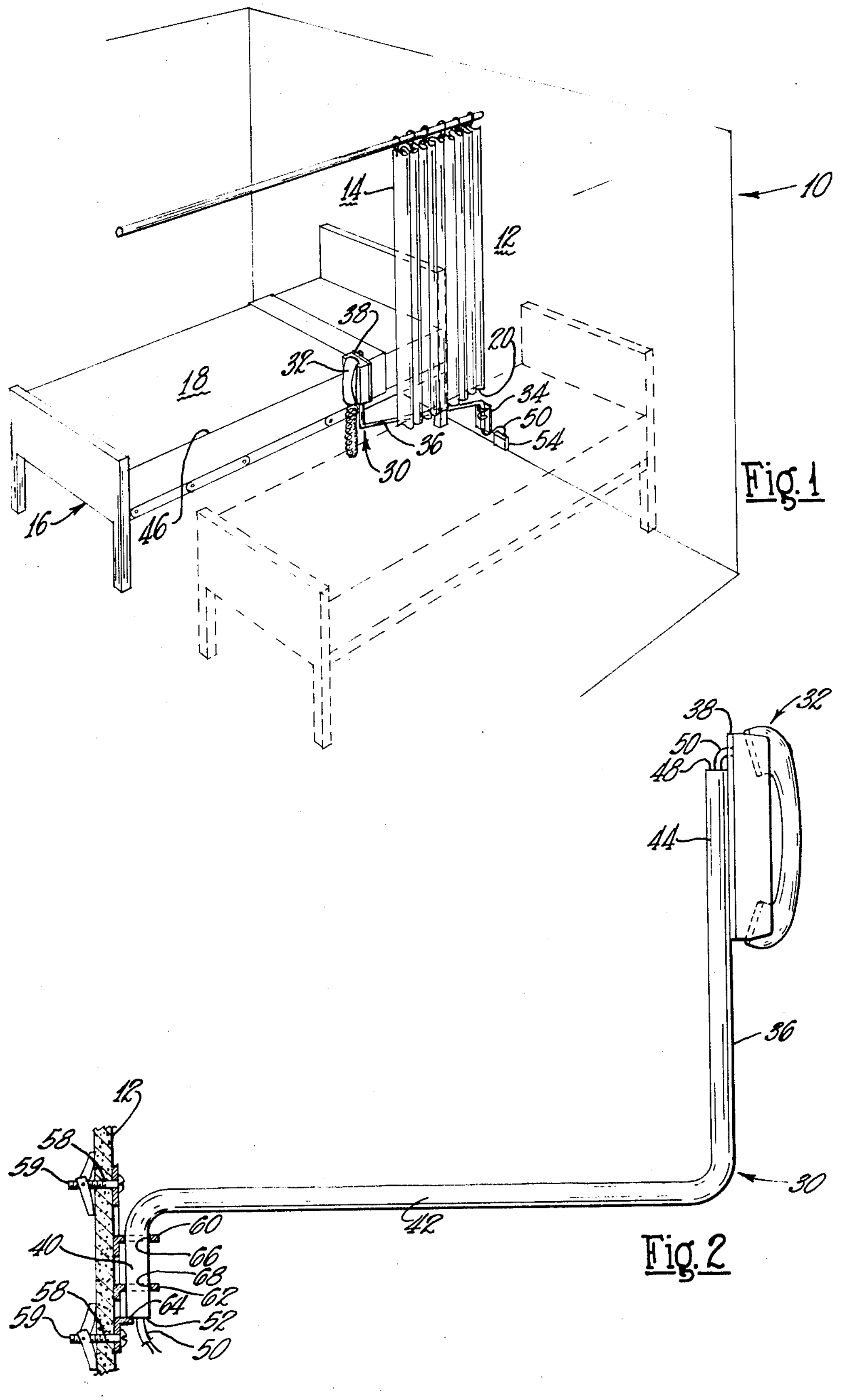
FIG. 1 is a view showing the present invention.
FIG. 2 is an enlarged view showing the telephone bracket of the instant invention in greater detail.

The present invention provides a swingable telephone bracket for use in a hospital room having an adjustable bed therein. A privacy curtain is suspended above the floor of the room and movable to a position for providing privacy for a patient lying on the bed. A swingable telephone support mounted on a head wall of the room has one portion extending a predetermined horizontal distance into the room beneath the privacy curtain and below the lowest adjustment level of the bed, and another portion extending a predetermined vertical distance relative thereto.

The telephone support includes a first plate member adapted to be mounted on a wall of the room, an arm member pivotably attached to the first plate member, and a second plate member fixedly attached adjacent an end of the arm remote from the first plate member and adapted to receive a telephone thereon. The arm includes a first portion mounted for relative pivotal movement with respect to the wall mounting plate, a second portion extending for a first predetermined horizontal distance with respect to the first portion, and a third portion extending generally vertical to the second portion for a second predetermined distance for engaging a surface at the side of the bed. Thus, a telephone mounted on the support bracket may be placed within easy reach of a patient lying on the bed in all operable raised or lowered positions of the hospital bed without overlapping the bed.

In a preferred embodiment, with reference to FIG. 1, there is disclosed a hospital room 10 having a head wall 12. A privacy curtain 14 and an adjustable hospital bed 16 are shown in the room 10 adjacent the head wall 12. The hospital bed 16 is of a well known standard type generally used in hospitals and has a surface 18, which is movable to a plurality of positions to provide comfort for a patient lying on the bed. Thus, the surface 18, may be raised, lowered, or tilted as desired or necessary.

The privacy curtain 14, has a lower edge 20 which extends below the surface 18 of the bed 16 in the lowermost adjustment position thereof to thereby provide privacy for a patient lying on the bed whenever the privacy curtain 14 is drawn.

A telephone support apparatus, generally designated by the numeral 30, is mounted on the head wall 12 adjacent the bed 16 for supporting a telephone 32 for swingable movement relative thereto. In the illustrated embodiment, the telephone 32 is of the Trimline type having the telephone dialing apparatus disposed in the handset thereof, whereby a patient using the telephone may conveniently dial his own telephone calls without excessive reaching or stretching.

The telephone support apparatus 30 includes a wall mounting plate or bracket member 34, an extension arm 36 and a telephone mounting plate or bracket member 38. As shown in FIG. 1, the wall mounting plate 34 is attached to the head wall 12 of the room adjacent the bed 16. The extension arm 36 has a first portion 40 pivotally attached to the wall mounting plate member 34, a second portion 42 extending for a predetermined horizontal distance relative to the wall 12, and a third portion 44 extending for a predetermined vertical distance generally parallel to an edge 46 of the bed 16. The telephone mounting plate 38 is disposed adjacent an upward most end 48 of portion 44 and is thereby adapted to support the telephone 32 thereon. The arm 36 is preferably of tubular configuration to thereby provide a conduit for enabling a telephone cord 50 to easily pass from the telephone 32 to adjacent the wall 12. The extension arm 36 has an opening 52 in the end thereof adjacent the head wall 12 to allow the telephone cord 50 to pass from the arm 36 for connection to a telephone circuit 54 disposed on the wall 12 of the room 10.

The particular predetermined horizontal and vertical distances for a given application must be chosen from a knowledge of the minimum and maximum height of bed adjustment, length of privacy curtain used and particular location available for mounting in a particular room.

With reference to FIG. 2, showing the construction of the telephone support apparatus of the present invention in greater detail, the wall mounting plate 34 has a plurality of holes 56, 58 passing therethrough and is thereby adapted to be attached to the head wall 12 by means of toggle bolts 59 or the like. The mounting plate 34 further includes a plurality of tabs 60, 62 and 64 extending from one surface thereof. The tabs 60, 62 have a pair of aligned openings 66 and 68 respectively therein for slidably receiving portion 40 of extension arm 36 to thereby provide for swingable movement thereof. The tab 64 of wall mounting plate 34 is positioned to engage a lower end of portion 40 to provide a vertical support for the telephone support apparatus 30 during swinging movement of extension arm 36.

In operation, when the privacy curtain 20 is in the open or undrawn position, the telephone 32 may be swingably positioned adjacent the bed 16. The privacy curtain 20 may then be drawn to provide privacy for a patient lying on the bed without interference between the telephone support apparatus 30 and the lower edge of the privacy curtain 22. Portion 44 is sufficiently long to insure engagement with the edge 46 of the bed 16 in all operable positions thereof and thereby prevent the telephone apparatus from over swinging and extending over the surface 18 of the bed 16. The telephone 32 may thus be positioned within easy reach of the patient in all operable positions of the bed.

The particular predetermined distances used in manufacturing a telephone support apparatus according to the foregoing specification may vary in accordance with the size of the room, the type of beds used and spacing of distance between the beds without departing from the scope of the invention.

Although for purposes of the preferred embodiment my invention has been illustrated and described as a wall mounted telephone support bracket, it should now be evident to those skilled in the art that my invention may likewise be practiced using telephone supports configured for mounting on the floor or any other surface of the hospital room.

The present invention thus not only provides a telephone support apparatus which will hold the telephone at the patient's bed side and pivot so that the patient in the bed on either side of the telephone may easily reach it, but one which will eliminate interference between the support and closing of a privacy curtain used in the room. More importantly, the present invention will also prevent interference between the telephone support apparatus and the hospital bed during adjustment thereof and will eliminate a safety hazard to patients.

Having described my invention in such a manner as to enable one of ordinary skill in the art to which it pertains to practice it, I now claim:

1. Apparatus for supporting a telephone relative to a wall, said apparatus comprising a support plate configured to be attached to said wall, said support plate having a plurality of spaced apart first tab portions integral therewith extending from a surface thereof, said first tab portions having aligned openings therethrough, and a second tab portion integral with said support plate spaced remote from said first tab portions, said second tab portion being substantially in alignment with the openings in said first tab portions, a tubular member having a shaped configuration including a first portion, a second portion extending generally perpendicular to said first portion, and a third portion extending generally perpendicular to said second portion and parallel to said first portion, said third portion being substantially longer than said first portion, said first portion extending through the aligned openings in the first tab portions of said support plate with one end of said tubular member abuttingly engaging said second tab portion, and a telephone mounting member attached to said tubular member at an end of said third portion remote from said first portion.

2. Apparatus of claim 1 wherein said tubular member has a circular cross-section and the apertures in said first tab portions are slightly larger in diameter than the diameter of said tubular member.

3. In the combination of a bed disposed in a room, said bed having a side surface thereon, and a swingable telephone support mounted in said room for swingable movement relative to the bed, the improvement wherein said telephone support includes means operable to engage the side surface of said bed to limit movement of said support relative to said bed whereby a telephone mounted on said support may be positioned relative to said bed but is prevented from extending over said bed.

4. The invention of claim 1 wherein said means operable to engage said side surface includes a vertically extending bar on said telephone support.

5. Apparatus for supporting a telephone in a hospital room in association with a bed having a surface which is adjustable to a plurality of raised or lowered positions and an edge surface thereon, said apparatus comprising;

a telephone mounting portion located approximate the highest adjustment level of the bed and extending to a position below lowest adjustment level thereof, an extension arm portion connected to and extending from the telephone mounting portion to a location adjacent a wall of the room, said extension arm portion being generally perpendicular to the telephone mounting portion, and means for securing said extension arm to a surface of the hospital room for swinging movement relative thereto, whereby a telephone on the telephone mounting portion can be positioned adjacent to the bed for use by a patient lying on the bed but is prevented from overlapping the bed by engagement with the edge surface thereof and thereby prevented from interfering with adjustment of the bed.

6. The invention of claim 1 wherein the telephone mounting portion engages the edge surface of the bed in all operable raised or lowered positions thereof when disposed adjacent thereto to thereby limit movement of said extension arm.

7. Apparatus for supporting a telephone in a hospital room in association with an adjustable bed and a privacy curtain, the privacy curtain being suspended in the room and movable to provide privacy for a patient lying on the bed, the lower edge of the privacy curtain being disposed below the lowest adjustment level of the bed, said apparatus comprising;

a telephone mounting portion located approximate the highest adjustment level of the bed and extending to a position below the privacy curtain, an extension arm portion extending from the telephone mounting portion to a location adjacent a wall of the room, a portion of said extension arm lying parallel to the bed and being located beneath the lower edge of the privacy curtain, and means swingably securing said extension arm to a surface of the hospital room for swinging movement relative thereto so that a telephone on the telephone mounting portion can be moved relative to the bed for use by a patient lying on the bed without interfering with closing of the curtain.

8. The invention of claim 7 wherein the improvement comprises means for engaging an edge surface of the bed when said apparatus is disposed adjacent thereto to prevent said apparatus from extending over the bed.

9. Apparatus for supporting a telephone in a hospital room in association with a hospital bed positioned adjacent a wall of the room, the hospital bed having a surface which is adjustable to a plurality of raised or lowered positions to provide comfort for a patient lying thereon, the hospital room having a privacy curtain suspended in the room and movable to a position to provide privacy for a patient lying on the bed, the lower edge of the privacy curtain extending below the surface of the bed when the surface is adjusted to the lowermost position, said apparatus comprising a wall mounting bracket adapted to be attached to the wall adjacent one end of the bed at a position below the lower edge of the privacy curtain, an arm member pivotally attached to said wall mounting bracket, said arm member having a first portion for extending a first predetermined horizontal distance from the wall into the room, and a second portion extending upwardly from said first portion to a position above the surface of said bed in its uppermost raised position, and a plate member fixedly attached approximate the uppermost end of said second portion and adapted for mounting a telephone thereon whereby a telephone mounted on said plate member may be positioned within easy reach of a patient lying on the bed in all operable positions of the bed without interfering with closing of the privacy curtain.

10. The invention of claim 9 wherein said arm is of tubular configuration to provide a conduit for a cord of a telephone which may be attached to said plate member.

* * * * *